July 2, 1946.    J. H. WOODWARD    2,403,202
FISH LURE
Filed Oct. 26, 1944
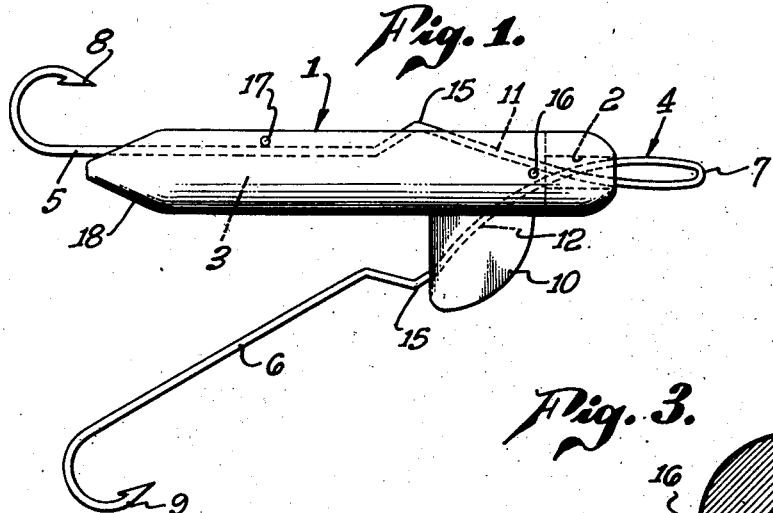
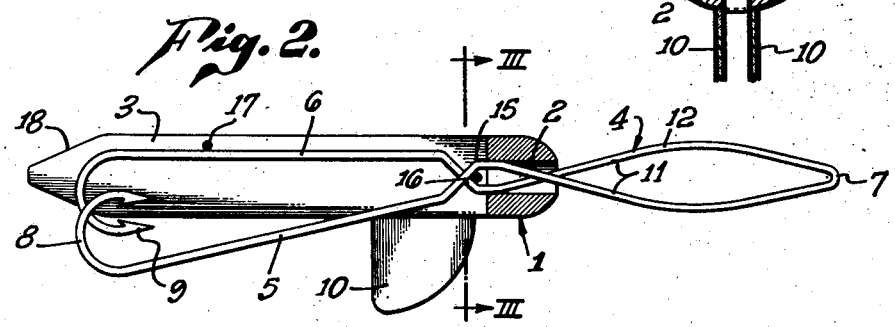
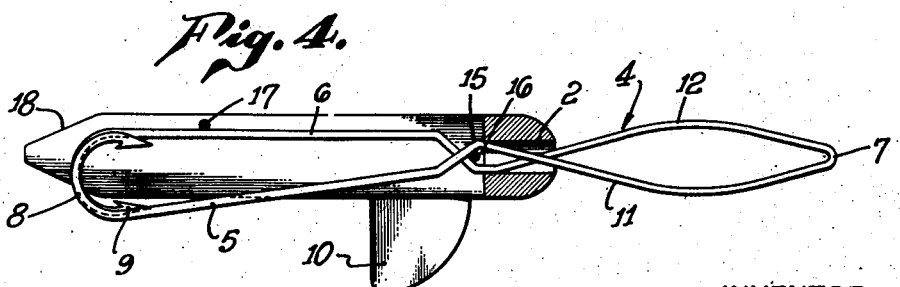
INVENTOR.
JOSEPH H. WOODWARD,
BY
ATTORNEY.

Patented July 2, 1946

2,403,202

UNITED STATES PATENT OFFICE 2,403,202

FISH LURE

Joseph H. Woodward, Los Angeles, Calif.

Application October 26, 1944, Serial No. 560,386

7 Claims. (Cl. 43—35)

My invention relates to fish lures and has as its principal object the provision of an artificial bait member more or less simulating the appearance of a small fish, in which one or more hooks are adapted to be substantially concealed within the body of the lure and will spring out of the lure when it is attacked by a fish.

Another object of my invention is to provide a fish lure of the character described, in which the hook member and bait member are mounted for longitudinal movement relative to each other and in which an attacking fish striking the bait member will move the bait member forwardly relative to the hooks to release the hook member from its concealed position.

Another object of my invention is to provide a fish lure of the character described wherein the hook member is constructed in the form of a pair of arms extending longitudinally through the bait member, the arms being resiliently connected together at the forward end of the bait member to urge the arms laterally of the bait member to set the hook in the mouth of an attacking fish.

Another object of my invention is to provide a fish lure of the character described wherein the bait member is provided with one or more narrow laterally extending fins to minimize spinning of the bait member.

Another object of my invention is to provide a fish lure of the type described in the preceding paragraph wherein the shape of the forward edges of the fins is such as to merge with the shape of the forward end of the body of the bait to minimize entanglement of the bait in weeds or under water growth.

Another object of my invention is to provide a fish lure of the character described wherein the fins employed extend laterally of the body of the bait a sufficient distance to constitute an abutment against which the mouth of an attacking fish will strike to thereby cause a forward movement of the bait relative to the hook members associated therewith.

Other objects and advantages of my invention will be apparent from a study of the following specifications read in connection with the accompanying drawing wherein Fig. 1 is a side elevational view of a fish lure constructed in accordance with my invention and illustrating the position of the hook member in its extended position relative to the artificial bait or body member;

Fig. 2 is a longitudinal sectional view through the lure shown in Fig. 1, illustrating the position of the hook member in its retracted position;

Fig. 3 is a transverse sectional view taken along line III—III of Fig. 2; and

Fig. 4 is a longitudinal sectional view similar to Fig. 1 and illustrating the positions of the hook member and body member when the lure is bitten between the jaws of an attacking fish.

Referring to the drawing, I have illustrated my fish lure as comprising a body member 1 which is preferably formed as an elongated member generally simulating the appearance of a small fish. The particular shape illustrated herein is that of a substantially cylindrical body or plug, from the forward end of which extends a longitudinal bore 2 communicating with a transverse slot 3 extending the remaining length of the body member 1.

The hook member indicated generally at 4 is preferably formed with a pair of rearwardly extending arms 5 and 6 interconnected at their forward ends as indicated at 7 by a sufficiently resilient connection as will normally urge the arms 5 and 6 laterally apart. In the form illustrated herein, the hook member 4 is constructed as a single piece of spring wire bent back at its midpoint to form the interconnection 7, the hook member being in the general shape of a V in its extended position in which the apex of the V comprises a loop by which the hook members may be secured to the end of a line while the ends of the arms of the V may be bent forwardly to form hooks 8 and 9.

The resilience of the looped or V-shaped hook member is such as to normally urge the arms 5 and 6 divergently apart to dispose the hooked ends thereof a substantial distance apart while the forward ends of the arms are located sufficiently close to each other as to permit the passage of the loop end 7 through the bore 2 of the body or bait member 1, preferably projecting a sufficient distance beyond the forward end of the body member 1 to permit the ready connection of a line thereto.

The hook member 4 is therefore mounted in the body 1 for longitudinal movement relative to the body, the spread of the legs 5 and 6 at the rearward end of the bore 2 being such that when the loop end 7 is drawn forwardly with respect to the body or bait 1, diametrically opposite sides of the bore 2 will compress the arms 5 and 6 toward each other, moving the hook ends 8 and 9 toward each other to dispose the hooks relatively close together.

I prefer that the extent of the movement of the arms 5 and 6 toward each other will be such that the hooks will be substantially disposed within the recess formed by the slot 3 in the bait member 1 in such fashion as to substantially shield the hook ends when the hook member is in its retracted position as shown in Fig. 2.

As thus far described, it will be apparent that by sliding the body 1 rearwardly with respect to the loop end 7 of the hook member 4, or by pulling the hook member 4 forwardly with respect to the body 1, the arms 5 and 6 will be drawn to their retracted or hook-shielded positions and the effect of pulling upon the line while the lure is in the water will be to hold the hook member 4 in its retracted position.

I prefer to provide upon the body 1 a pair of laterally extending fins 10 which extend laterally from the sides of the bait member 1 a sufficient distance to be engaged by the mouth of an attacking fish, with the result that the striking of the fins by the fish will tend to move the bait member 1 forwardly of the hook member 4. This forward movement will allow the resilience of the hook member 4 to move the arms 5 and 6 laterally apart while within the mouth of the attacking fish and thus securely set the hooks.

To insure that the bait member will move forwardly a sufficient distance to permit the maximum spread of the arms 5 and 6, I form the portions 11 and 12 to normally extend at a substantially wide angle to each other, presenting contact surfaces to the body at the rear end of the bore 2 extending at an angle to the rear edge of the bore 2, such that spreading movement of the portions 11 and 12 will produce a resultant forward thrust on the body 1 to permit still further spreading movement.

Thus as long as the bait is not attacked and a forward strain is placed upon the loop 7, the hooks will remain in their retracted position but any release of such strain will result in the projecting of the hooks 8 and 9 from their contracted or concealed positions to their extended positions.

Since it frequently occurs that an attacking fish may close its mouth only upon the rear end of the bait member 1 and may not engage the fins 10, I prefer to provide a trigger action for the hook member 4 which will cause the arms 5 and 6 to be moved apart upon such biting.

This may be readily accomplished by forming one of the arms, such as the arm 6, of such shape that at least a portion thereof will extend below the body 1 when the hook member is in its retracted position, as is illustrated particularly in Fig. 2, and by forming a bend 15 in the arms 5 and 6 immediately forwardly of the portions 11 and 12 thereof, the amount of the bend being such that when the hook member 4 is in its forward position, as shown in Fig. 2, the bent portions 15 will lie substantially parallel to each other and present surfaces engaging the interior walls of the bore 2 substantially parallel with the longitudinal extent of these walls. Also a stop or pin 16 is provided extending laterally of the slot 3 immediately to the rear of the rear end of the bore 2 to be engaged by the portions of the arms 5 and 6 just rearwardly of the bent portions 15, the position of the pin 16 and its abutment with the arms 5 and 6 being such as to hold the parallel portions 15 only partially within the bore 2.

Thus if a fish bites upon the rear end of the bait 1, the biting action will move the arm 5 upwardly a slight distance such as to the position shown in Fig. 4, causing the bend 15 of this arm to be fulcrumed about the rear edge of the bore 2 to substantially straighten out the bend 15 and to thus dispose the surface of the portion 15 on the arm 11 at an angle relative to the surface of the bore 2. The resilience of the hook member 4 now will exert forces on the rear edge of the bore 2, tending to move the bait 1 forwardly along the hook member until the bend 15 has been completely removed from the bore 2, the angular relation of the portions 11 and 12 of the hook member thereafter causing the further forward movement of the bait 1 as hereinbefore described, resulting in the spreading of the hooks 8 and 9 apart.

To aid in holding the bends 15 parallel with the surface of the bore 2, I prefer to provide a guide member 17 extending across the slot 3 adjacent the upper edge thereof at some point spaced a considerable distance rearwardly of the pin 16, against which the upper surface of the arm 5 may ride to establish the parallel relationship between the bend 15 in the arm 5 and the contiguous surface of the bore 2. The guide member 17 is illustrated herein as being readily formed by merely extending a pin laterally through the body 1 so that it crosses the slot at the desired rearward position and at the desired height in the slot 3.

I prefer to use two fins disposed on the lower side of the body and extending parallel to each other at opposite sides of the slot 3, such arrangement tending to make the bait float with the slot 3 extending vertically rather than sidewise. Also the shape of the edges of the fins 10 disposed forwardly of the body 1 may be curved or otherwise shaped to present an edge which will readily slide over the obstructions or sea weed through which the bait may be dragged, thus making the bait substantially "weedless." Also, as will be observed from an inspection of Fig. 2, the arm 5 is disposed below that portion of the hook 9 which may extend out of the body of the bait to present a surface tending to prevent any obstruction or sea weed from becoming engaged by the exposed end of the hook 9.

The construction of my lure makes it readily disengageable from the mouth of the fish after the same has been landed, it being merely necessary to grasp the loop 7 and then slide the bait body 1 rearwardly, moving the hooks to their contracted position, the tapered rear end 18 of the body 1 acting to separate the hooks from the tissues in which they may be embedded.

While the body member 1 may be formed of any suitable material, I prefer to form the same of wood, in which case it is desirable to line the interior of the bore 2 with some material which will provide a relatively hard smooth surface to the portions of the arms 5 and 6 which are to be drawn into or retracted from the bore 2. One form of lining is illustrated in Fig. 3 as providing a coating of acetate or similar plastic paint 20 which will harden into a hard smooth film. In fact, I find it advantageous to dip or coat the entire body with such material, not only as a means of providing the desired lining for the bore 2 but also to lend strength to the body and to provide a preservative coating thereon, as indicated at 19.

While I have shown and described the preferred embodiment of my invention, I do not desire to be limited to any of the details of construction shown and described herein, except as defined in the appended claims.

I claim:

1. In a fish lure, a body member having a restricted longitudinal passage extending from one end thereof and into communication with a longitudinal recess extending from at least one side of the body, a hook member comprising a pair of arms interconnected at one of their ends, at least a portion of said hook member being formed of resilient material to normally urge the free ends of said arms away from each other, said hook member being mounted in said body for longitudinal movement relative thereto by disposing the connected ends of said arms through said passage and beyond the forward end of said body whereby movement of said arms forwardly relative to the body and into said passage will contract the arms toward each other and into said recess, and a hook on at least one of said arms.

2. In a fish lure, a hook member comprising a pair of arms interconnected at one of their ends, at least a portion of said hook member being formed of resilient material to normally urge the free ends of said arms away from each other, a body member, means mounting said hook member on said body member including a longitudinal recess extending from one side of said body member to receive said arms, a restricted longitudinal passage through the forward end of said body member communicating with said recess and through which said joined ends of said arms may pass to project out of the forward end of said body member, the width of said passage being less than the normal spread of the free ends of said arms whereby forward movement of said diverging arms into said passage will contract the arms toward each other and into said recess, and a hook on at least one of said arms.

3. In a fish lure, a hook member comprising a length of spring wire bent back upon itself into a substantial V-shape, defining a loop at the apex of the V and a pair of diverging arms normally held in divergent positions by the resilience of said spring wire, a body member, means mounting said hook member in said body member including a longitudinal recess extending from one side of said body member to receive said arms, a restricted longitudinal passage through the forward end of said body member communicating with the recess and through which the apex of the V may pass, whereby movement of said hook member forwardly relative to said body member will contract the diverging arms toward each other and into said recess, and a hook on at least one of said arms.

4. In a fish lure, a hook member comprising a length of spring wire bent back upon itself into a substantial V-shape, defining a loop at the apex of the V and a pair of diverging arms normally held in divergent positions by the resilience of said spring wire, a portion of said arms immediately adjacent the apex of the V extending parallel to each other for a predetermined distance, a body member, means mounting said hook member on said body member including a longitudinal recess extending from one side of said body member to receive said arms, a restricted longitudinal passage through the forward end of said body member communicating with said recess and through which the loop and parallel portions of the arms may pass to project the loop out of the forward end of said body member, the width of said passage being less than the normal spread of the free ends of said arms, whereby movement of said hook member forwardly of said body member will cause the diverging arms to engage the sides of said passage and contract the arms toward each other and into said recess, and a hook on the free end of at least one of said arms.

5. In a fish lure, a hook member comprising a length of spring wire bent back upon itself into a substantial V-shape, defining a loop at the apex of the V and a pair of diverging arms normally held in divergent positions by the resilience of said spring wire, a portion of said arms immediately adjacent the apex of the V extending parallel to each other for a predetermined distance, a body member, means mounting said hook member on said body member including a longitudinal recess extending from one side of said body member to receive said arms, a restricted longitudinal passage through the forward end of said body member communicating with said recess and having a pair of parallel sides and through which the loop and parallel portions of the arms may pass to project the loop out of the forward end of said body member, the width of said passage being less than the normal spread of the free ends of said arms, whereby movement of said hook member forwardly of said body member will cause the diverging arms to engage the sides of said passage and contract the arms toward each other and into said recess, each of said arms being bent toward the other for a short distance along the length of the arm forming an angle between said arms which when said bent portion is drawn into said passage presents surfaces on said contracted arms parallel to the sides of said passage, abutment means on said body engageable by said hook member to limit the movement of said bent portions into said passage for a distance less than the length of said bent portions, whereby compression of said arms further toward each other will dispose the bent portion of at least one of said arms in non-parallel relation to the side of said passage to cause the resilience of said spring wire to urge said arms apart to exert a forward movement on the body member and a consequent spreading of the free ends of said arms, and a hook on at least one of said arms.

6. In a fish lure, a hook member comprising a length of spring wire bent back upon itself into a substantial V-shape, defining a loop at the apex of the V and a pair of diverging arms normally held in divergent positions by the resilience of said spring wire, a portion of said arms immediately adjacent the apex of the V extending parallel to each other for a predetermined distance, a body member, means mounting said hook member on said body member including a longitudinal recess extending from one side of said body member to receive said arms, a restricted longitudinal passage through the forward end of said body member communicating with said recess and through which the loop and parallel portions of the arms may pass to project the loop out of the forward end of said body member, the width of said passage being less than the normal spread of the free ends of said arms, whereby movement of said hook member forwardly of said body member will cause the diverging arms to engage each other and move into said recess, a hook member on the free end of at least one of said arms, and a fin extending laterally of said body adjacent the forward end thereof to form an abutment against which the mouth of an attacking fish will strike to urge said body member forwardly relative to said hook member to allow said arms to spread apart.

7. In a fish lure, a hook member comprising a length of spring wire bent back upon itself into a substantial V-shape, defining a loop at the apex of the V and a pair of diverging arms normally held in divergent positions by the resilience of said spring wire, a portion of said arms immediately adjacent the apex of the V extending parallel to each other for a predetermined distance, a body member, means mounting said hook member on said body member including a longitudinal recess extending from one side of said body member to receive said arms, a restricted longitudinal passage through the forward end of said body member communicating with said recess and through which the loop and parallel portions of the arms may pass to project the loop out of the forward end of said body member, the width of said passage being less than the normal spread of the free ends of said arms, whereby movement of said hook member forwardly of said body member will cause the diverging arms to engage the sides of said passage and contract the arms toward each other and into said recess, a hook member on the free end of at least one of said arms, and a fin extending laterally of said body adjacent the forward end thereof to form an abutment against which the mouth of an attacking fish will strike to urge said body member forwardly relative to said hook member to allow said arms to spread apart, said fin having its forward edge converging toward the exterior surface of said body to guide said body over obstructions.

JOSEPH H. WOODWARD.